UNITED STATES PATENT OFFICE.

JOSEF SCHULER, OF BASEL, SWITZERLAND, ASSIGNOR TO SOCIETY OF CHEMICAL INDUSTRY IN BASLE, OF BASEL, SWITZERLAND.

UNSATURATED ETHER OF ETHENYLPARADIOXYDIPHENYLAMIDIN.

1,384,637. Specification of Letters Patent. Patented July 12, 1921.

No Drawing. Application filed March 9, 1921. Serial No. 450,928.

*To all whom it may concern:*

Be it known that I, JOSEF SCHULER, a citizen of the Swiss Republic, and resident of Basel, Switzerland, have invented a new and useful Unsaturated Ether of Ethenylparadioxydiphenylamidin, (for which I have filed an application in Switzerland, July 22, 1919) of which the following is a full, clear, and exact specification.

I have found that a new unsaturated ether of ethenylparadioxydiphenylamidin, viz. the ethenyl-p-dialloxydiphenylamidin, can be obtained by condensing p-aminophenylallylether with acet-p-aminophenolallylether in presence of phosphorus haloids, phosphorus oxyhaloids or phosphorus pentoxid and, if desired, in presence of a solvent or a diluent.

The new body is a valuable local anesthetic particularly adapted for ophthalmological practice. It constitutes colorless crystals, melting at 85 to 86° C., very readily soluble in alcohol and ether and insoluble in water and forming a hydrochlorate melting at 152 to 153° C. which is easily soluble in alcohol somewhat less soluble in water and insoluble in ether.

The new unsaturated ether of ethenyl-p-dioxydiphenylamidin can be prepared according to the following examples.

Example I.

120 gr. of p-aminophenolallylether, 154 gr. of acet-p-aminophenolallylether, 600 gr. of benzene and 150 gr. of phosphorus trichlorid are heated for 4 hours on a water bath, while stirring, in a vessel provided with a reflux cooler. At the end of the reaction the benzene and the phosphorus trichlorid are distilled off. It remains a brown doughy residue, which is dissolved in 8 liters of boiling water. After cooling the solution is separated by filtration from the little residue, which has not been dissolved, and the yellow bright solution thus obtained is made alkaline by adding ammonia.

The ethenyl-p-dialloxydiphenylamidin separates at first as an oil, but crystallizes after some time. The crystals are separated by suction, washed with water, and re-crystallized from a mixture of water and alcohol, pure white crystals of ethenyl-p-dialloxydiphenylamidin of the fusion point 85 to 86° C. separating from the said mixture.

The hydrochlorate of ethenyl-p-dialloxydiphenylamidin obtained by neutralizing the base dissolved in ether with alcoholic hydrochloric acid melts at 152 to 153° C. The base is very easily soluble in alcohol and ether, insoluble in water, its hydrochlorid is readily soluble in alcohol, less easily in water and insoluble in ether.

Example II.

120 gr. of p-aminophenolallylether and 154 gr. of acet-p-aminophenolallylether are dissolved in 1 liter of xylene and the solution thus obtained is heated with 160 gr. of phosphorus pentoxid, while stirring, in a vessel provided with reflux cooler. The further the reaction progresses, the more the solution is discolored, its coloration being transmitted to the phosphoric anhydrid. After complete discoloration, the mass is cooled, the xylene is decanted and the remaining residue is dissolved in about 8 liters of hot water. The base is separated in the same manner as in Example I.

Example III.

148 gr. of hydrochlorid of p-aminophenolallylether, 152 gr. of acet-p-aminophenolallylether and 700 ccm. of phosphorus trichlorid are heated on a water bath, while stirring, in a vessel provided with a reflux cooler, until the phosphorus trichlorid begins to boil. The reaction continues then from itself with some vivacity. The solution becomes clear and homogeneous. After about 1 hour, when the phosphorous trichlorid has ceased to boil, the phosphorus trichlorid is distilled off *in vacuo*. There remains a brown, doughy mass, which is dissolved in 8 liters of hot water and further treated in the same manner as in Example I.

What I claim is:

As a new product, the herein described ethenyl-p-dialloxydiphenylamidin, being a local anesthetic particularly adapted for ophthalmological practice and constituting colorless crystals melting at 85 to 86° C., very readily soluble in alcohol and ether and insoluble in water and forming a hydrochlorid melting at 152 to 153° C., which dissolves easily in alcohol, is less soluble in water and is insoluble in ether.

In witness whereof I have hereunto signed my name this 18th day of February, 1921, in the presence of two subscribing witnesses.

JOSEF SCHULER

Witnesses:
 FIEDOR KURZ,
 AMAND RITTEOF.